Figure 1:
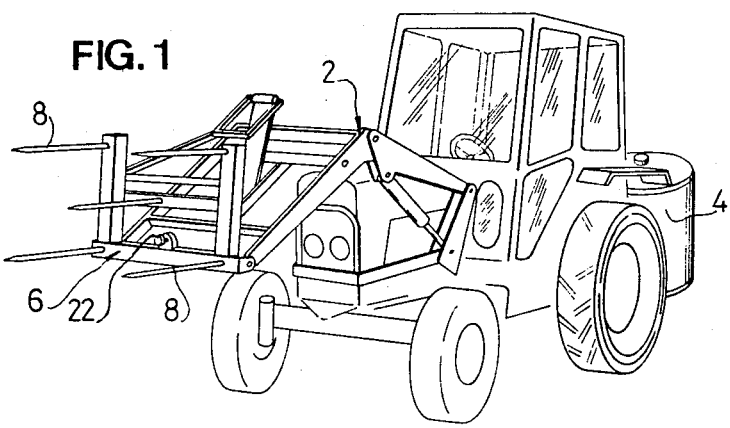

United States Patent [19]

Korsgaard

[11] 4,450,178

[45] May 22, 1984

[54] METHOD AND A SYSTEM FOR TREATING LARGE STRAW BALES, PARTICULARLY ROUND BALES, WITH AMMONIA OR OTHER LYE AGENTS

[76] Inventor: Ebbe Korsgaard, Agerövej 14, Karby, Denmark

[21] Appl. No.: 361,913

[22] PCT Filed: Jul. 14, 1981

[86] PCT No.: PCT/DK81/00071

§ 371 Date: Mar. 15, 1982

§ 102(e) Date: Mar. 15, 1982

[87] PCT Pub. No.: WO82/00235

PCT Pub. Date: Feb. 4, 1982

[30] Foreign Application Priority Data

Jul. 15, 1980 [DK] Denmark .............................. 3048/80

[51] Int. Cl.³ .............................................. A23K 1/22
[52] U.S. Cl. ..................................... 426/69; 426/281; 426/335; 426/626; 426/636; 426/807; 99/533; 99/534
[58] Field of Search ................. 426/69, 335, 281, 626, 426/807, 532, 636; 99/532, 533, 534; 100/73, 74, 75; 414/24.5

[56] References Cited

U.S. PATENT DOCUMENTS

| | | | |
|---|---|---|---|
| 1,196,138 | 8/1916 | Muller | 99/533 |
| 1,332,629 | 3/1920 | McIntyre | 99/532 X |
| 3,483,810 | 12/1969 | Peters et al. | 99/532 |
| 4,064,276 | 12/1977 | Conradsen et al. | 426/69 |
| 4,069,029 | 1/1978 | Hudson | 426/69 |
| 4,073,532 | 2/1978 | Blair | 414/24.5 |
| 4,120,405 | 10/1978 | Jones et al. | 414/24.5 |
| 4,182,780 | 1/1980 | Lagerstrom et al. | 426/626 X |
| 4,185,549 | 1/1980 | Roepnack | 99/533 X |
| 4,254,151 | 3/1981 | Townsend | 99/532 X |

*Primary Examiner*—R. B. Penland
*Attorney, Agent, or Firm*—Antonelli, Terry & Wands

[57] ABSTRACT

For supplying a desired amount of ammonia to a straw bale, particularly a large round bale, in order to convert the straw material into a feedstuff, the bale is subjected to an ammonia injection treatment in direct association with the bale being reloaded from a local receiving position to a final storing position by a tractor fitted with a suitable bale carrier implement. The bale carrier implement may comprise carrier spears which are provided with injector for supplying the ammonia to the interior of the bales from an ammonia tank carried by the tractor itself.

4 Claims, 4 Drawing Figures

U.S. Patent  May 22, 1984  4,450,178

METHOD AND A SYSTEM FOR TREATING LARGE STRAW BALES, PARTICULARLY ROUND BALES, WITH AMMONIA OR OTHER LYE AGENTS

The present invention relates to a method of treating large straw bales, particularly round bales, with ammonia or another lye agent.

Large straw bales as left in the field are normally handled by being loaded onto a transportation cart by means of a tractor loader, whereafter they are brought home to the farm, where they are again handled by a tractor loader so as to be moved from the cart to a suitable storing place. When the bales are to be treated with ammonia for later use as a feedstuff it is customary to deposit the bales temporarily in a treating station, in which they are provided with a sheet coating, under which is introduced a predetermined amount of ammonia, and after a certain treating time the coating may then be removed and the bales brought to their final storing place. The treating time is rather long, especially for so-called round bales since the peripheral surface layers of the bales are compacted, such that the ammonia enters into the bale practically solely through the end surfaces thereof, or even only through the one end surface located adjacent the ammonia inlet.

The invention is based on the recognition that a much faster intrusion and distribution of the ammonia in the bale material is achievable by a direct injection into the single bale, whereby the compact outer bale layer will not obstruct the intrusion, but invertedly act to retain the injected ammonia in the bale, whereby there is no need to use any special coating on the bale. For carrying out an injection e.g. into a central area of the bale a relative movement between the bale and an injection means will be necessary, and the invention further takes this condition into account by providing for the movement to take place integrally with the mechanical transportation and handling of the bales, i.e. the tractor is used for effecting the injection movement.

When the ammonia is introduced by injection the required duration of the injection will not be very long, and normally it will not go beyond the time interval necessary for the very transportation of the bale from the cart to the final storing place. Therefore, while the tactor is readily usable to cause an injection spear to be forced into the bale in connection with the picking up of the bale, it is even usable to constitute a moving treating station which is operative during the required reloading of the bale, such that no or very little extra time is spent on the ammonia treatment. The tractor may carry the necessary ammonia tank or have its injection means connected to a stationary tank through a flexible hose.

Even if for some reason it should be undersired to let the tractor carry the ammonia tank or show the hose connection, the tractor will still be usable to effect the injection movement in connection with the reloading of the bale, viz. by using it to drive the bale against a stationary injector means. In that case, of course, the reloading time will be prolonged by the necessary injection time and by the extra driving time for bringing the bale to and from the injector means, but the injector station may be located close to the driving track between the unloading position of the cart and the final storing place.

The invention also relates to a corresponding system for carrying out the ammonia injection, all as defined in the appended claims.

Figure 2:
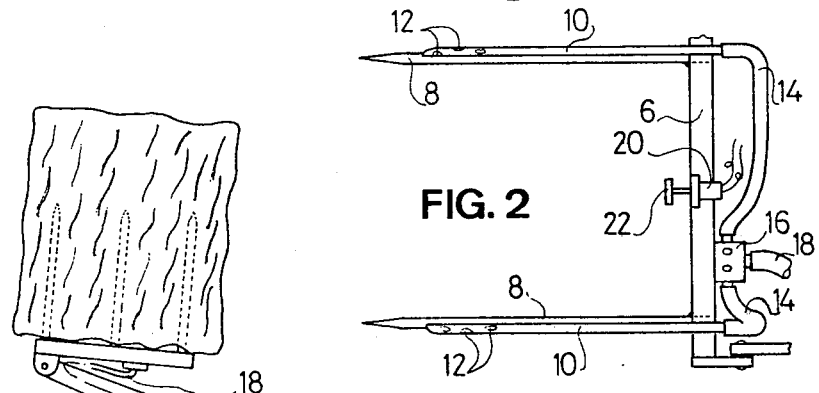
Figure 3:
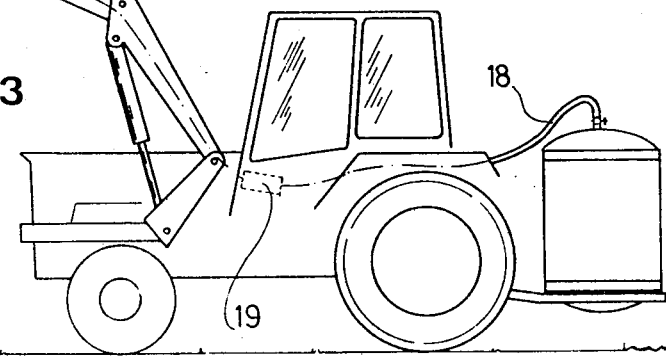
Figure 4:
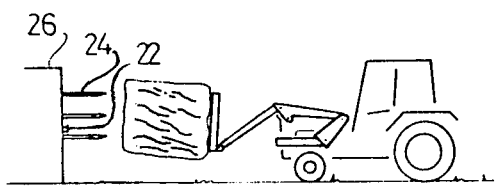

In the following the invention is described in more detail with reference to the drawing, in which:

FIG. 1 is a perspective view of a tractor fitted with a system according to the invention, FIG. 2 is a more detailed top view of the injection means, FIG. 3 is a side view of the tractor during an injection operation, and FIG. 4 is a side view of a modified system according to the invention.

The tractor shown in FIG. 1 is fitted with a front loader generally designated 2 and with a rear ammonia tank 4. The working implement of the front loader is a heavy frame member 6 provided with a plurality of forwardly directed spears 8, such a spear implement already being well known for the handling of large bales.

According to the invention, however, the spears 8 are each provided with an injector pipe 10 as shown in FIG. 2. The pipes 10, which are firmly secured to the spears 8 by welding or otherwise, are closed at their outer ends, but provided with a few side holes 12 near the outer end. At their rear ends, the tubes 10 project through the frame 6 and are connected, through hoses 14, with the respective outlets of an ammonia distributor 16, the inlet of which is connected to the ammonia tank 4 through a hose 18, which passes a suitable control valve unit 19 (FIG. 3).

On the frame 6 is mounted an electric switch 20 having an actuator push button shaped as a disc 22, which is normally located in a position in front of the frame 6. The switch 20 is connected with the control valve unit 19.

With the implement raised and forwardly oriented as shown in FIG. 1 the tractor may be driven so as to force the spears 8,12 into a large round bale lying on a cart. The length of the pipes 10 is such that the outlet holes 12 will be located approximately midways in the bale, when the front side thereof is met by the frame 6. When this happens the push buttom disc 22 will be operated by the bale surface, and the switch 20 provides a signal to the control unit 19. This may cause the control unit to open for the ammonia supply to the injector pipes 10 through the distributor 16, or at least the signal may actuate a lamp or another indicator telling the operator that the bale is ready for injection.

During the injection the operator may prefer to tilt the bale to an upright position as shown in FIG. 3, whereby the bale is safely supported by the frame, without any tendency of straw material happening to get gravitationally forced against the outlet holes 12.

The ammonia injection is terminated by a timer included in the control unit 19, and normally an injection time of about one minute or even less will be sufficient. It will be appreciated that the operator may in the meantime drive the bale towards its final storing place and unload it when e.g. an indicator lamp has indicated the termination of the injection.

Tractor spear implements are known in various designs, e.g. with the spears associated with a grab or shovel. Generally such implements may easily be adapted with injector pipes according to the invention, whereby it will not always be necessary to mount injector pipes on all the spears. On the other hand, if an implement is built particularly according to the invention the separate pipes 10 may of course be avoided, if hollow spear tubes 8 are used.

As mentioned, if it is not desired to use a tractor supported tank 4 nor a hose connection to a stationary tank, then the tractor is usable anyway for effecting the injection treatment, viz. in connection with a stationary injector system, e.g. as shown in FIG. 4. In this case a suitable number of injection spears 24 is mounted horizontally and rigidly on a fixed support 26 which may well be a building wall portion, and the tractor is used simply for driving the bale onto and away from the spears as an additional routine in the reloading of the bales from the cart to the final storing place. For automatic operation the switch actuator 22 of FIG. 2 is also used in FIG. 4 though now associated with the fixed support 26.

It will be understood that the invention is in no way limited to the use of any particular type of tractor loading equipment and though a front loader is a preferable equipment a loader device based on a rear standard lift system of the tractor will be prefectly usable. In connection with FIG. 4, of course, even the type of the bale carrier implement is unimportant as long as it is able to safely carry a bale onto the spears 24 and retract it from the spears; it would of course be possible to arrange for the spears 24 themselves to be retractable into the support, but probably such a solution would be unnecessarily expensive.

The system for injecting ammonia or another lye agent into the bales may be combined with means for supplying water or moisture to the bales e.g. through the same injection spears, whereby a very dry straw material may be conditioned for an improved effect of the ammonia treatment. Likewise it may be advantageous when certain vitamins and minerals can be supplied to the straw material in direct association with the ammonia treatment.

I claim:

1. A method of treating compacted straw bales with ammonia or lye comprising loading a compacted bale on a bale handling implement of a tractor, said implement having injection and gripping means including at least one spear, transporting the loaded compacted bale on the bale handling implement of the tractor from a receiving position to a final storage position, and while transporting or loading said bale introducing the ammonia or lye into said compacted bale through at least one spear of said injection means during transporting and loading of the bale, said introducing step includes forcing said injection means into the compacted bale by movement of the bale handling implement.

2. An apparatus for treating straw bales with ammonia or lye comprising a tractor gripping means including at least one spear, a bale handling implement carried by said tractor gripping means for loading and transporting the bale from a receiving position to a final storage position, injector means including at least one injection spear introduced into the compacted bale by movement of the bale handling implement, and means for injecting the ammonia or lye into an interior of the compacted bale when said at least one injection spear is introduced into the bale during the transporting or loading of the bale on the bale handling implement.

3. An apparatus for treating straw bales with ammonia or lye comprising a tractor carried bale reloading implement having at least one spear for supporting the bale, said reloading implement being used in connection with reloading of the bale from a receiving position to a final storing position, and an injector means including at least one injection spear mounted on said bale reloading implement, said implement being introduced into a single bale, the at least one injection spear being forced into the bale by movement of the bale reloading implement, a switch actuator mounted adjacent a root of the injection spears operatively connected with control means for enabling the ammonia or lye injection to be initiated.

4. An apparatus according to claim 3, wherein said control means includes timer means for interrupting an injection of the ammonia.

* * * * *